United States Patent [19]

Sugihara

[11] Patent Number: 5,194,409
[45] Date of Patent: Mar. 16, 1993

[54] PROCESS FOR PRODUCING BN-COATED SIC WHISKER AND PROCESS FOR PRODUCING CERAMIC COMPRISING SAID BN-COATED SIC WHISKER AS REINFORCEMENT

[75] Inventor: Takaomi Sugihara, Gotenba, Japan

[73] Assignee: Tokai Carbon Co., Ltd., Tokyo, Japan

[21] Appl. No.: 715,254

[22] Filed: Jun. 14, 1991

[30] Foreign Application Priority Data

Jul. 23, 1990 [JP] Japan .................. 2-194401

[51] Int. Cl.$^5$ .................. C04B 35/52; C04B 35/56
[52] U.S. Cl. .................. 501/92; 501/95; 501/96; 264/65
[58] Field of Search .................. 501/92, 88, 95, 96, 501/87, 127, 103; 264/62, 65

[56] References Cited

U.S. PATENT DOCUMENTS

| | | | |
|---|---|---|---|
| 4,604,367 | 8/1986 | Takamizawa et al. | 501/95 |
| 4,810,436 | 3/1989 | Johnson | 264/29.1 |
| 4,837,230 | 6/1989 | Chen et al. | 501/88 |
| 4,915,760 | 4/1990 | Singh et al. | 156/89 |
| 4,978,643 | 12/1990 | Venkataswamy et al. | 501/94 |
| 5,024,979 | 6/1991 | Debaig-Valade et al. | 501/95 |
| 5,057,465 | 10/1991 | Sakamoto et al. | 501/90 |
| 5,071,600 | 12/1991 | Deleeuw et al. | 264/22 |

FOREIGN PATENT DOCUMENTS 62-12671 1/1987 Japan.
63-182258 7/1988 Japan.

OTHER PUBLICATIONS

English Abstract of JPA 63-277565.
English Abstract of JPA 64-3079.
English Abstract of JPA 1-115875.

Primary Examiner—Mark L. Bell
Assistant Examiner—Alan Wright
Attorney, Agent, or Firm—Armstrong, Westerman, Hattori, McLeland & Naughton

[57] ABSTRACT

The present invention discloses a process for producing a boron nitride-coated SiC whisker, comprising dissolving a borazine represented by the following formula (I) in hexane, dispersing a SiC whisker in the resultant solution, collecting the SiC whisker thus treated by filtration, drying and baking it in a non-oxidizing atmosphere at 1000° to 1800° C. to form a boron nitride coating on the surface of the SiC whisker:

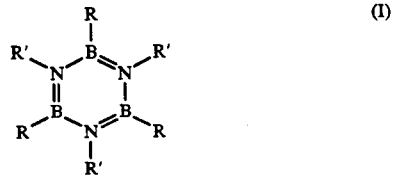

wherein R is an atom or a group selected from the group consisting of Cl, N(C$_2$H$_5$)$_2$, NH$_2$, NHCH$_3$ and CH$_3$, and R' is an atom or a group selected from the group consisting of H and CH$_3$.

7 Claims, No Drawings

PROCESS FOR PRODUCING BN-COATED SIC WHISKER AND PROCESS FOR PRODUCING CERAMIC COMPRISING SAID BN-COATED SIC WHISKER AS REINFORCEMENT

BACKGROUND OF THE INVENTION

The present invention relates to a process for producing a SiC whisker having a surface coated with BN (boron nitride) and a process for producing a fiber-reinforced ceramic (FRC) wherein use is made of the BN-coated SiC whisker as a reinforcement.

Ceramic materials have been used as various structural members to be used at a high temperature, including parts of engines, by virtue of their excellent heat resistance, high-temperature strength, chemical stability, etc. The ceramic materials, however, are generally poor in the fracture toughness and have an inherent drawback that the occurrence of even small flaw and internal defect causes stress to be concentrated, so that they are apt to fracture.

For this reason, in recent years, studies have widely been made on a method of improving the fracture toughness of ceramic materials, and many proposals have been made on an attempt to improve the toughness through the use of a SiC whisker as a reinforcement of ceramic materials. The purpose of these proposals is to improve the fracture toughness through function exerted by dispersing a SiC whisker having a high elasticity in a ceramic to form a composite material, such as the termination or inhibition of the growth of cracks in the ceramic, the relaxation of the stress concentration by virtue of the deflection of the cracks, and the energy absorption at the tip of the cracks by virtue of a pull-out effect of the whisker.

The composite effect attained by the use of the SiC whisker as a reinforcement is greatly influenced by an interfacial bonding between the SiC whisker and the ceramic matrix. Specifically, when the interfacial bond is strong, the above-described function of improving the toughness cannot be sufficiently exhibited, while when the interfacial bond is weak, this portion unfavorably becomes starting point of the cracks.

An excessive interfacial bond between the SiC whisker and the ceramic material as the matrix is mainly due to the occurrence of a chemical reaction at the interface of the both during sintering. Therefore, if the surface of the SiC whisker is previously modified so that the chemical reaction hardly occurs, the interfacial bonding is relaxed and the above-described function of improving the toughness can be effectively attained.

This has led to the development of processes for producing a ceramic composite material wherein SiC whiskers having a surface coated with various unreactive substances are used as a reinforcement (see, for example, Japanese patent application Kokai publication Nos. 62-12671, 63-182258, 63-277566, 64-3081 and 1-115877.

In order to effectively improve the fracture toughness through the use of a surface-modified SiC whisker, besides the chemical unreactiveness of the coating substance with the matrix, the surface of the whisker should have a lubricity or cushioning property for promoting the pull-out effect. A suitable substance capable of meeting both the above-described requirements is BN.

Meanwhile the following methods have been proposed for forming a BN coating on the surface of the SiC whisker:

(A) a method described in Japanese patent application Kokai publication No. 62-12671, (B) a method described in Japanese patent application Kokai publication No. 63-182258, and (C) a method described in Japanese patent application Kokai publication No. 63-277566.

The method (A) comprises chemically depositing BN on the surface of a SiC whisker through the use of a mixed gas comprising $B_2H_6$ (diborane) and $NH_3$. Since, however, $B_2H_6$ is a substance which readily ignites in the air, this method is problematic in that the operation of BN deposition is accompanied with danger.

The method (B) comprises forming a BN coating through the thermal decomposition of $B_3N_3H_6$ (borazole). Since, however, borazole is used in a high concentration (10%), this method is problematic in that the thickness of the BN coating remarkably varies in a range of 0.02 to 0.3 $\mu$m and the thickness is too large to improve the fracture toughness of the ceramic.

The method (C) comprises chemically depositing BN through the use of a mixed gas comprising boron chloride, $NH_3$ and $H_2$. This method is disadvantageous in that the procedure is complicated and it is difficult to control the thickness of the BN layer.

SUMMARY OF THE INVENTION

A first object of the present invention is to provide a process for producing a BN-coated SiC whisker which enables a BN coating to be formed through a simple, stable operation and the coating thickness to be easily controlled.

A second object of the present invention is to provide a process for producing FRC wherein a BN-coated SiC whisker is used as a reinforcement.

The above-described first object of the present invention can be attained by dissolving a borazine represented by the following formula (I) in hexane, dispersing a SiC whisker in the resultant solution, collecting the SiC whisker thus treated by filtration, drying and baking it in a non-oxidizing atmosphere at 1000° to 1800° C. to form a boron nitride coating on the surface of the SiC whisker:

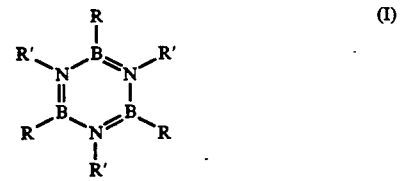
(I)

wherein R is an atom or a group selected from the group consisting of Cl, $N(C_2H_5)_2$, $NH_2$, $NHCH_3$ and $CH_3$, and R' is an atom or a group selected from the group consisting of H and $CH_3$.

The second object of the present invention can be attained by dissolving a borazine represented by the above formula (I) in hexane, dispersing a SiC whisker in the resultant solution, collecting the SiC whisker thus treated by filtration, drying and baking it in a non-oxidizing atmosphere at 1000° to 1800° C. to form a boron nitride coating on the surface of the SiC whisker, mixing the resultant boron nitride-coated SiC whisker with a ceramic powder and sintering the mixture in a non-oxidizing atmosphere by means of a hot press.

PREFERRED EMBODIMENTS OF THE INVENTION

In the process for producing a BN-coated SiC whisker according to the present invention, use is made of a borazine represented by the following formula (I):

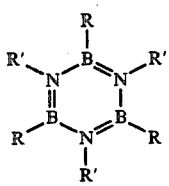

wherein R is Cl, $N(C_2H_5)_2$, $NH_2$, $NHCH_3$ or $CH_3$, and R' is H or $CH_3$. As is apparent from the formula (I), the above-described borazine has a six-membered ring structure wherein three boron atoms and three nitrogen atoms are alternately bonded to each other, and the six-membered ring has a resonance structure and a stability similar to those of benzene.

In the present invention, various borazines represented by the above-described formula (I) can be used. Among them, trichloroborazine (R=Cl, R'=H) and triaminoborazine (R=$NH_2$, R'=H) are particularly preferred.

In the present invention, a hexane solution of the borazine is used. In dissolving the borazine in hexane, it is preferred that the borazine be added in an amount of 0.3 to 3.0% by weight to hexane and the mixture be allowed to stand for a sufficient period of time until the borazine is completely dissolved to a molecular level.

Further, it is preferred to disperse a small amount of ZnO simultaneously with the addition of the borazine. In this case, ZnO serves as a catalyst for promoting the reaction of the BN layer. A suitable amount of addition of ZnO is about 0.03 to 0.1% by weight based on hexane.

A SiC whisker is dispersed in the resultant solution of borazine in hexane.

An acicular crystal of silicon carbide having a diameter of 0.1 to 8 μm and a length of 10 to 100 μm is used as the SiC whisker. If necessary, prior to use, a hydrofluoric acid (HF) treatment is conducted for the purpose of removing $SiO_2$ present on the surface of the silicon carbide whisker.

The amount of dispersion of the SiC whiskers is preferably 50 to 200 g per liter of the hexane solution of borazine. When the amount is outside the above-described range, it becomes difficult to form a homogeneous BN layer having a thickness of 15 to 100 Å suitable for the formation of a composite material.

The dispersion of the SiC whisker is conducted by making use of agitating means until the surface of the whisker is sufficiently wet with the solution. Subsequently, the SiC whisker is separated by fraction, and the resultant wet cake of the SiC whisker is minutely disintegrated and dried.

The wet SiC whisker thus obtained is dried by heating it to a temperature of 100° to 150° C. until the borazine component is completely self-condensed and the condensate is fixed to the surface of the SiC whisker.

The SiC whisker having a thin borazine coating uniformly fixed to the surface thereof is transferred to a baking oven filled with a nonoxidizing atmosphere such as nitrogen or argon, where the baking treatment is conducted at 1000° to 1800° C.

During the baking treatment, the borazine present on the SiC whisker undergoes a thermal reaction to cause the borazine to be converted into BN, so that a thin film layer having a thickness of 15 to 100 Å is formed. The thickness of the BN layer is controlled by regulating the concentration of the borazine in the hexane solution of borazine and varying the filtration pressure in the separation of the SiC whisker from the SiC dispersion in the hexane solution of borazine by filtration to vary the content of the hexane solution of borazine in the wet SiC whisker.

In the process for producing a ceramic comprising a BN-coated SiC whisker as a reinforcement according to the present invention, the BN-coated SiC whisker produced by the above-described process is mixed with a ceramic powder and the mixture is sintered in an inert atmosphere or in vacuo.

There is no particular limitation on the ceramic powder as the matrix and, for example, ceramic powders of various carbides, nitrides or oxides, such as SiC, TiC, $Si_3N_4$, TiN, $Al_2O_3$, $ZrO_2$, mullite, cordierite and sialon, may be suitably used.

The amount of addition of the BN-coated SiC whisker to the matrix powder is 10 to 35% by volume. When the amount is less than 10% by volume, no desired improvement in the properties can be attained, while when it exceeds 35% by volume, no improvement in the properties can be attained due to insufficient dispersion of the SiC whisker.

It is preferred to conduct the mixing of the matrix powder with the BN-coated SiC whisker together with the addition of a sintering assistant, such as $Y_2O_5$, in water, i.e. in a wet process. The subsequent filtration and drying provide a homogeneous powder mixture.

The amount of addition of the sintering assistant is 0.5 to 5% by weight based on the matrix. When the amount is less than 0.5% by weight, the sintering is insufficient. On the other hand, when it exceeds 5% by weight, there occurs an abnormal grain growth of a matrix structure, so that the toughness lowers.

Then, the mixed powder is sintered by means of a hot press in a non-oxidizing atmosphere, for example, in an inert gas atmosphere, such as nitrogen or argon, or in vacuo, thus obtaining a ceramic having an excellent fracture toughness.

The sintering temperature is 1350° to 1850° C., and the pressure of the press is 25 to 50 MPa.

According to the present invention, a borazine uniformly adhered and fixed to a SiC whisker through relatively simple steps of the dispersion of a SiC whisker in a borazine solution, filtration and drying undergoes a thermal reaction in the step of sintering to cause the borazine to be smoothly converted into a BN layer. This reaction can be promoted in the presence of ZnO as a catalyst, and a BN coating having a thickness of 15 to 100 Å suitable for attaining an excellent pull-out effect can be formed through the regulation of the concentration of the borazine solution and the rate of filtration of the SiC whisker dispersed in the borazine solution.

The BN layer formed on the surface of the SiC whisker serves to suppress the interfacial reaction of the SiC with the ceramic material as the matrix during sintering and, at the same time, to effectively enhance the pull-out effect of the SiC whisker through the function of surface lubrication thereof. This enables the fracture toughness of the FRC sinter to be predominantly improved.

The present invention will now be described in more detail by way of the following Examples.

EXAMPLE 1

5 g of trichloroborazine and 0.3 g of ZnO were mixed with 500 ml of hexane, and the mixture was allowed to stand for 7 days to prepare a solution wherein the borazine had been dissolved to a molecular level. 50 g of β-Sic whiskers having a diameter of 0.5 to 2 μm and a length of 30 to 100 μm were put into the resultant solution, and sufficient mixing was conducted by agitation for dispersion of the whiskers.

The dispersion was filtered at a high speed by means of a suction filter to obtain a wet cake of the SiC whiskers. The wet cake was sufficiently disintegrated and dried at a temperature of 80° C. to remove the hexane component. It was further heated at 120° C. for 2 hr to conduct the condensation of the borazine, thereby fixing a uniform coating of trichloroborazine to the SiC whisker.

Thereafter, the SiC whisker to which the borazine component had adhered and fixed was transferred to an electric furnace under a nitrogen atmosphere, where it was baked at a temperature of 1400° C. for 2 hr.

The surface of the SiC whisker thus treated was observed under a transmission electron microscope (TEM). As a result, it has been found that a uniform layer having an average thickness of 35 Å was formed. Further, the electron diffraction of the coating has revealed that the coating comprised a microcrystalline BN.

EXAMPLE 2 AND COMPARATIVE EXAMPLES 1 AND 2

The BN-coated SiC whiskers prepared in Example 1 and a $Si_3N_4$ powder (a matrix) containing 3% by weight of $Y_2O_3$ as a sintering assistant were dispersed and mixed with each other in ethanol. The dispersion was filtered, and the solid matter was dried to prepare a homogeneously mixed powder. The mixed powder was hot-pressed in vacuo under conditions of a temperature of 1800° C. and a pressure of 35 MPa to prepare a SiC whisker-reinforced $Si_3N_4$ material having a diameter of 50 mm, a thickness of 5 mm and a Vf value of 10%.

The fracture toughness and flexural strength of the FRC sinter thus obtained were measured, and the results are given in Table 1.

For comparison, properties were measured also for a FRC sinter having a Vf value of 10% prepared by making use of a SiC whisker having a surface not coated with BN (Comparative Example 1) and a sinter comprising $Si_3N_4$ only (Comparative Example 2), and the results are given in Table 1.

TABLE 1

| Ex. No. | Fracture toughness (MPa $\sqrt{m}$) | Flexural strength (MPa) |
|---|---|---|
| Ex. 2 | 6.4 | 630 |
| Comp. Ex. 1 | 5.8 | 630 |
| Comp. Ex. 2 | 5.2 | 600 |

From the results given in Table 1, it is apparent that the FRC sinter according to the present invention has a fracture toughness predominantly improved over that of the materials of the Comparative Examples.

EXAMPLE 3

Surface-modified SiC whiskers respectively having 70 Å-thick and 105 Å-thick BN layers were prepared in the same manner as that of Example 1 while regulating the concentration of trichloroborazine in a wet SiC whisker cake obtained by filtration of a SiC whisker dispersion. These surface-modified SiC whiskers were combined with a $Si_3N_4$ matrix powder in the same manner as that of Example 2, thereby forming FRC sinters different from each other in the Vf value.

The fracture toughness (MPa$\sqrt{m}$) of each of the above-described materials was as given in Table 2.

TABLE 2

| Thickness of BN layer Å | Vf of SiC whisker (%) | | |
|---|---|---|---|
| | 10 | 15 | 20 |
| 70 | 6.5 | 7.9 | 8.4 |
| 105 | 6.0 | 6.8 | 7.5 |

From the Table 2, it is apparent that when the thickness of the BN layer is 70 Å, a FRC having a high fracture toughness can be prepared, while when the thickness of the BN layer exceeds 100 Å, the fracture toughness of the FRC lowers.

EXAMPLE 4

5 g of triaminoborazine and 0.3 g of ZnO were mixed with 500 ml of hexane, and the mixture was allowed to stand for 7 days to prepare a solution wherein the borazine had been dissolved to a molecular level.

50 g of β-SiC whiskers having a diameter of 0.5 to 2 μm and a length of 30 to 100 μm were put into the resultant solution, and sufficient mixing was conducted by agitation for dispersion of the whiskers. The dispersion was filtered at a high speed by means of a suction filter to obtain a wet cake of the SiC whiskers. The wet cake was sufficiently disintegrated and dried at a temperature of 80° C. to remove the hexane component. It was further heated at 120° C. for 2 hr to conduct the condensation of the borazine, thereby fixing a uniform coating of triaminoborazine to the SiC whisker. Thereafter, the condensate-coated SiC whisker was transferred to an electric furnace under a nitrogen atmosphere, where it was baked at a temperature of 1400° C. for 2 hr. The surface of the BN-coated SiC whisker was observed under a transmission electron microscope (TEM). As a result, it has been found that a uniform layer having an average thickness of 40 Å was formed. Further, the electron diffraction of the coating has revealed that the coating comprised a microcrystalline BN. (The reason why the film thickness is larger than that in the case of trichloroborazine is believed to reside in an improvement in the wettability of the SiC whisker by the hexane solution of triaminoborazine because the substituent is an amino group ($NH_2$-).)

EXAMPLE 5

The BN-coated SiC whiskers prepared in Example 4 and a $Si_3N_4$ powder (a matrix) containing 3% by weight of $Y_2O_3$ as a sintering assistant were dispersed and mixed with each other in ethanol. The dispersion was filtered, and the solid matter was dried to prepare a homogeneously mixed powder. The mixed powder was hot-pressed in vacuo under conditions of a temperature of 1800° C. and a pressure of 350 kgf/cm$^2$ to prepare a SiC whisker-reinforced Si₃N₄ material having a diameter of 50 mm, a thickness of 5 mm and a Vf value of 10%. The fracture toughness and flexural strength of the resultant FRC sinter were measured and found to be 6.4 (MPa.√m) and 630 MPa, respectively.

EXAMPLE 6

Surface-modified SiC whiskers respectively having 80 Å-thick and 120 Å-thick BN layers were prepared in the same manner as that of Example 4 while regulating the concentration of triaminoborazine and the content of the hexane solution of triaminoborazine in a wet SiC whisker cake obtained by filtration of the dispersion. Then, FRC sinters different from each other in the Vf value were prepared through the use of Si₃N₄ as the matrix in the same manner as that of Example 5. The fracture toughness (MPa√m) of each of the above-described materials was measured, and the results are given in Table 3.

TABLE 3

| Thickness of BN layer | Vf of SiC whisker (%) | | |
|---|---|---|---|
| Å | 10 | 15 | 20 |
| 80 | 6.6 | 8.1 | 8.6 |
| 120 | 5.8 | 6.5 | 7.1 |

From the Table 3, it is apparent that when the thickness of the BN layer is 80 Å, a FRC having a high fracture toughness can be prepared, while when the thickness of the BN layer exceeds 100 Å, the fracture toughness of the FRC lowers.

What is claimed is:

1. A process for producing a boron nitri-decoated SiC whisker, comprising dissolving a borazine represented by the following formula (I) in hexane, dispersing a SiC whisker in the resultant solution, collecting the SiC whisker thus treated by filtration, drying and baking it in a non-oxidizing atmosphere at to 1800° C. to form a boron nitride coating on the surface of the SiC whisker:

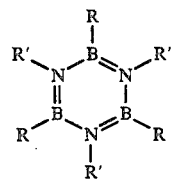

wherein R is an atom or a group selected from the group consisting of Cl, N(C₂H₅)₂, NH₂, NHCH₃ and CH₃, and R' is an atom or a group selected from the group consisting of H and CH₃.

2. A process according to claim 1, wherein the borazine is dissolved in hexane by adding the borazine in an amount of 0.3 to 3.0% to hexane and allowing the mixture to stand until the borazine is dissolved.

3. A process according to claim 1, wherein ZnO is dispersed in the hexane solution in an amount of about 0.03 to 0.1% by weight based on hexane.

4. A process according to claim 1, wherein the amount of dispersion of the SiC whisker is 50 to 200 g per liter of the hexane solution of the borazine.

5. A process according to claim 1, wherein the thickness of the boron nitride coating is 15 to 100 Å.

6. A process for producing a ceramic comprising a boron nitride-coated SiC whisker as a reinforcement, comprising dissolving a borazine represented by the following formula (I) in hexane, dispersing a SiC whisker in the resultant solution, collecting the SiC whisker thus treated by filtration, drying and baking it in a non-oxidizing atmosphere at 1000° to 1800° C. to form a boron nitride coating on the surface of the SiC whisker, mixing the resultant boron nitride-coated SiC whisker with a ceramic powder, and sintering the mixture in a non-oxidizing atmosphere at a temperature ranging from 1350° to 1850° C. by means of a hot press:

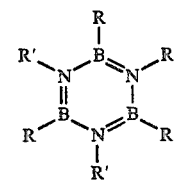

wherein R is an atom or a group selected from the group consisting of Cl, N(C₂H₅)₂, NH₂, NHCH₃, and CH₃, and R' is an atom or a group selected from the group consisting of H and CH₃.

7. A process according to claim 6, wherein the ceramic powder is a powder selected from the group consisting of carbide, nitride and oxide ceramic powders.

* * * * *